June 18, 1968 P. SOROS ET AL 3,388,818
CONVEYOR SYSTEM AND METHOD OF OPERATION THEREOF
Filed Dec. 5, 1966 3 Sheets-Sheet 1
FIG. I.
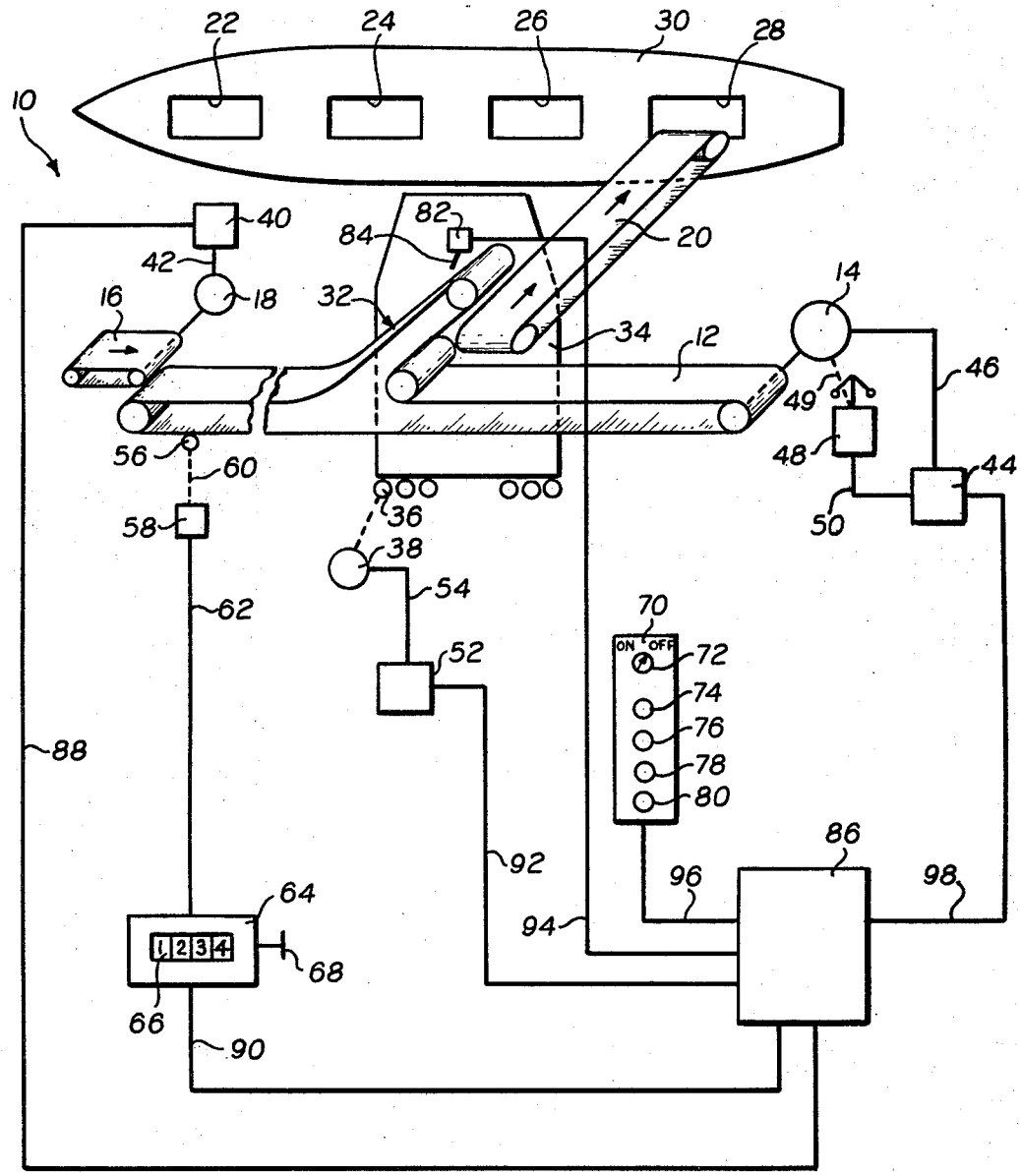
INVENTORS
PAUL SOROS
LESLIE C. FRIEL
BY
ATTORNEYS.

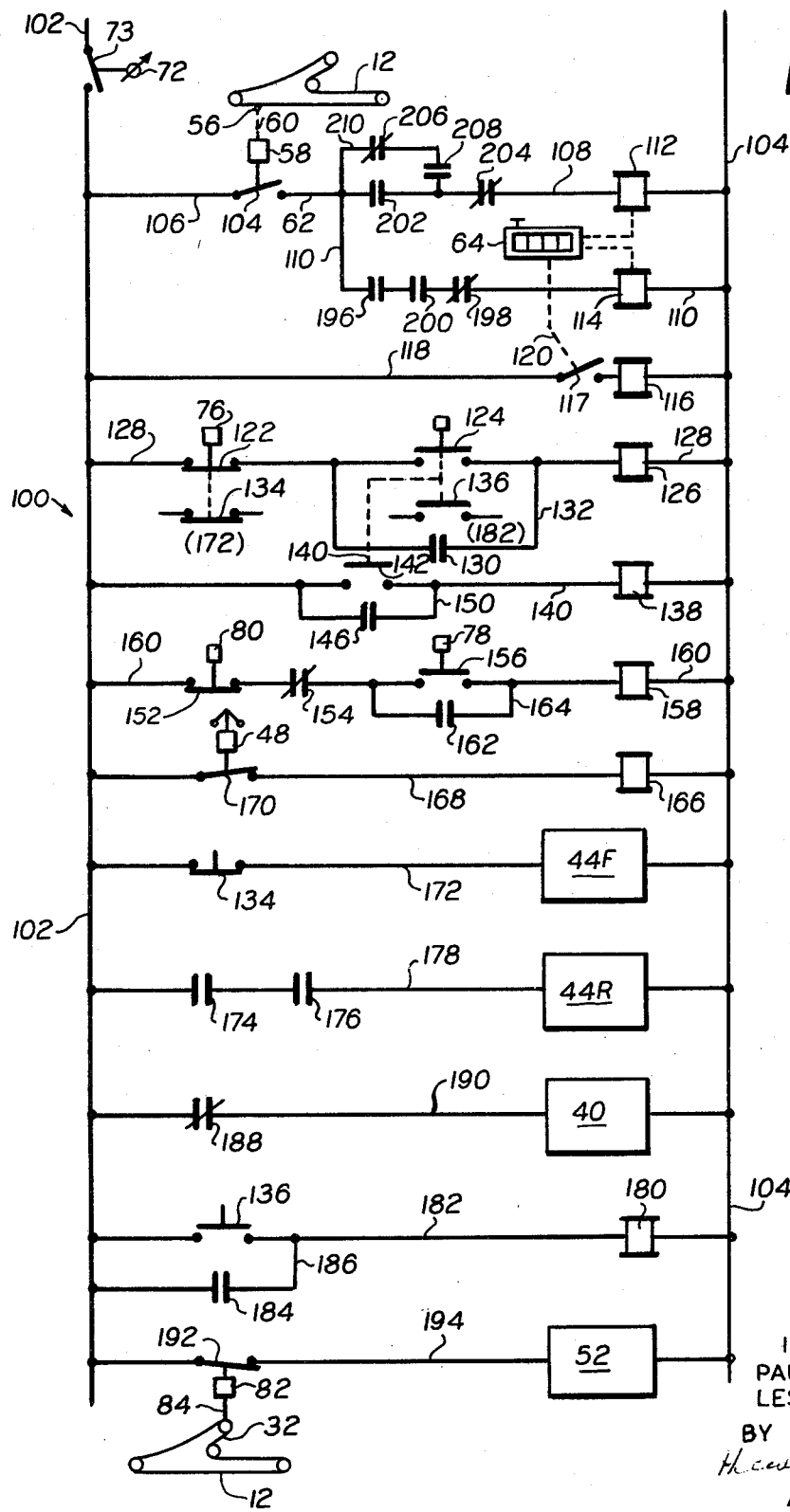

INVENTORS
PAUL SOROS
LESLIE C. FRIEL
BY
ATTORNEYS.

United States Patent Office 3,388,818
Patented June 18, 1968

3,388,818
CONVEYOR SYSTEM AND METHOD OF
OPERATION THEREOF
Paul Soros, New Canaan, Conn., and Leslie C. Friel, New York, N.Y., assignors to Paul Soros, New Canaan, Conn.
Filed Dec. 5, 1966, Ser. No. 599,602
15 Claims. (Cl. 214—14)

This invention relates to a shiploading conveyor system and the method of operation thereof and, more specifically, to such system and method as are particularly adapted to the loading of cargoes aboard large, multicargo hold ships.

In general, most of the conveyor systems of the prior art which are utilized in the loading of large, multicargo hold ships comprise a feeder conveyor which feeds the cargo to a main or dock conveyor which extends for a considerable distance along the dock in a manner generally parallel to the ship. Cargo transfer means in the nature of tripper means are usually provided on the main conveyor to transfer the cargo from the main conveyor to a traveling shiploader which extends generally transversely of the main conveyor to the opening in the particular cargo hold being loaded.

The ship loading procedure is complicated by the fact that the same generally cannot, due to the considerable weight of the cargo to be loaded and the resultant effect thereof on the trim of the ship, be accomplished by simply filling one cargo hold, namely the one nearest the feeder conveyor, and then stopping the feeder and main conveyor and moving the tripper means and shiploader relative to the main conveyor, in the direction which corresponds to forward or loading movement of the main conveyor until the shiploader is aligned with the next in the series of cargo holds, filling it, and then repeating this operation until the loading of the ship has been completed.

Instead, proper loading of a large, multicargo hold ship will usually require a series of stoppages of the feeder and main conveyor and a corresponding series of movements of the tripper means and shiploader, relative to the main conveyor, not only in the direction corresponding to the forward movement of the main conveyor, but also, in the direction opposite to the forward or loading movement of the main conveyor. The necessity for this reverse movement, as it may be termed, of the said tripper means and shiploader severely complicates the ship loading procedure by giving rise to the problem of the disposition of the cargo remaining on the main conveyor after the feeder conveyor has been stopped and the cargo limit, at that time, for the particular hold being loaded at that time, reached to require the stopping of the main conveyor. The disposition of this remaining cargo prior to reverse movement of the tripper means is, of course, made necessary by the undesirability of reverse movement of the tripper means relative to the main conveyor while the said cargo remains on the latter and blocks the path of reverse movement of the said tripper means. If reverse movement were to be accomplished with a loaded main conveyor, there would be a great amount of spillage of cargo which is wasteful and generally undesirable.

In many instances, the said remaining cargo may total over 300 tons in weight whereby is believed made even more apparent the magnitude of the problem.

No economical solution to this problem is found in the prior art as may be readily appreciated by the fact that the prior art solutions range from moving the ship to align a different cargo hold with the shiploader, a very expensive and time consuming maneuver at best, to providing means for accumulating the excess material in a bin of suitable capacity incorporated in the traveling ship loader which is a very expensive solution, considering the increased weight and cost of the traveling ship loader and the increased cost of the dock structure needed to support the ship loader.

Another similarly unsatisfactory solution of the prior art requires that the conveyor system operator anticipate how much more materials can be discharged by the shiploader into the particular cargo hold being loaded before the latter becomes, at that time, "fully" loaded, and discontinue operation of the feeder conveyor accordingly. In most instances this proves difficult due to the substantial length of the main conveyor and the substantial amount of materials supported thereby when fully loaded, whereby either of an inadequate filling of the said cargo hold, or an excess of materials remaining on the main conveyor, can result. Usually, to avoid excess material, the operator stops ahead of time, whereby to result in an underfilled hold which will require him to start feeding again. Such a discontinued feed causes an undesirable time delay.

It is, accordingly, a primary object of this invention to provide a conveyor system which includes main conveyor and material transfer means, and a method of operation of such system, which enable movement of said material transfer means in the reverse direction relative to said main conveyor, without necessitating the removal of materials remaining on said main conveyor, to thus result in very substantial savings in both time and money in the operation thereof.

Another object of this invention is the provision of a method of conveyor system operation as above which requires only the performance of simple, easily learned steps which may be readily accomplished by an experienced conveyor system operator.

Another object of this invention is the provision of a conveyor system as above which is of relatively simple design and construction, and requires the use of only readily available components of proven dependability in the manufacture thereof, to result in relatively low costs of manufacture and installation, and long periods of satisfactory, maintenance-free operation thereof.

A further object of this invention is the provision of a conveyor system, and a method of operation thereof, as above, which are particularly, though not exclusively, adapted to the loading of cargoes aboard large, multicargo hold ships.

The above and other objects and advantages of this invention are believed made clear by the following detailed description thereof taken in conjunction with the accompanying drawings wherein:

FIG. 1 is a block diagram of the conveyor system of the invention depicted in operative relationship with a ship to be loaded thereby;

FIG. 2 is a schematic diagram of a typical control circuit of the system of the invention.

Figure 3A:
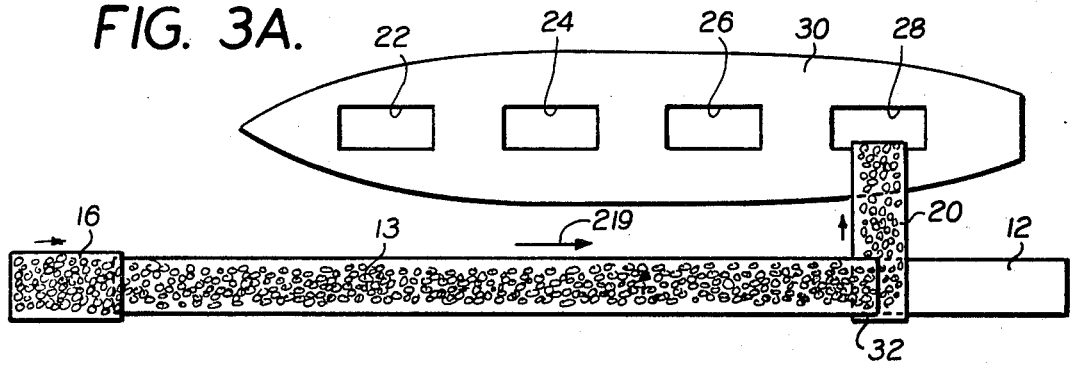
FIGS. 3A, 3B, 3C and 3D, respectively, depict the conveyor system of FIG. 1 at various stages during the operation thereof.

In general, and as illustrated by FIGS. 3A, 3B, 3C and 3D, the presently preferred method of this invention, as utilized for example to make possible the rapid and convenient movement of a shiploader 20 from alignment with cargo hold opening 28 of ship 30 to cargo hold opening 22 thereof, includes the steps of discontinuing the operation of a feeder conveyor 16 while leaving a dock conveyor 12 operating to move materials 13 toward tripper means 32 and shiploader means 20, and from the latter into the cargo hold opening 28 of the ship 30, to thus create an empty space 220 (FIG. 3B) on the said dock conveyor. Once a space of sufficient extent has been created, the dock conveyor 12 is stopped and driven in the reverse direction, i.e. toward feeder conveyor 16, to create another empty space 224 (FIG. 3C) thereon, it being noted that the empty space 220 makes possible this reverse movement of the dock conveyor without requiring the removal of the remaining materials 13 therefrom, or without resulting in any spillage of the said remaining materials. Then the tripper means 32 and the shiploader 20 are moved through empty space 224 from alignment with cargo hold opening 28 to alignment with cargo hold opening 22 (FIG. 3D) with this movement also being made possible without requiring the removal of the remaining materials 13, or spillage therefrom, from the dock conveyor 12 by the empty space 224. Once this has been accomplished, operation is again commenced, in normal manner, to load the materials 13 through cargo hold opening 22.

Referring now to FIG. 1, for a detailed description of the system of the invention, the same is indicated generally at 10 and, as presently preferred, comprises the main or dock conveyor 12, driven as indicated from conveyor drive motor 14, the feeder conveyor 16 disposed as shown above one extremity of the dock conveyor 12 and driven as indicated by a feeder conveyor drive motor 18, and the shiploader 20 which extends transversely of the dock conveyor 12 for registry with the cargo hold openings 22, 24, 26 or 28 respectively, of a ship 30. Although depicted in FIG. 1 as taking the form of a conveyor, it is to be understood that the shiploader 20 which, per se, forms no part of this invention, may take other forms, as for example, that of an inclined chute operable through the force of gravity.

Although particularly adapted to the loading of ships through the various cargo hold openings thereof, it is to be understood that the conveyor system, and method of operation thereof, the method and system of this invention are also well suited to the performance of other types of material transfers loading operations which require the loading of materials at spaced points.

The dock conveyor 12 includes the tripper means 32 of generally conventional construction, and the said tripper means and shiploader are supported from a support frame 34 which is movable longitudinally of the dock conveyor 12 through the medium of support frame drive wheels and drive motor as indicated at 36 and 38, respectively.

Thus, the materials 13 to be loaded aboard the ship 30 may be fed from feeder conveyor 16 to the dock conveyor 12, moved by the action of the latter to the right as seen in FIG. 1 until arrival at the tripper means 32, whereupon the said materials will be tripped from the main conveyor 12 to the shiploader 20 and moved by the latter in conventional manner to and through the ship cargo hold opening with which the said shiploader is aligned at that time. In addition, movement of the shiploader from alignment with one of the said ship cargo hold openings to another of the said ship cargo hold openings may be effected, subject to the problems discussed hereinabove, by actuation of shiploader support frame drive motor 38 with resultant change in shiploader-ship cargo hold opening registry.

Control means for controlling the operation of feeder conveyor drive motor 18 are indicated at 40, and are connected to the latter as indicated by line 42; while control means for controlling the operation of dock conveyor drive motor 14 are indicated at 44 and connected to the latter as indicated by line 46. A centrifugal force operated, zero speed switch is indicated at 48 and is connected to control means 44 as indicated by line 50. The zero speed switch is also mechanically connected to the dock conveyor drive motor 14, as indicated by the dashed line 49 extending therebetween. Control means 52 are provided to control the operation of shiploader drive motor 38 as indicated by line 54.

A dock conveyor contact wheel 56 is mechanically connected to a gearing and pulsing device 58, as indicated by the dashed line 60 extending therebetween, and is disposed as indicated in good frictional contact with the lower reach of dock conveyor 12, with the said wheel and device functioning to provide an output pulse on a pulse output line 62 for every complete revolution of the dock conveyor contact wheel 56 in the manner and for purposes described in detail hereinbelow.

An add-subtract counter is indicated at 64 and is connected as shown to the pulse output line 62. The said counter is preferably of the type manufactured and sold by Machinery Electrification, Inc. of Northborough, Mass., and described in detail in their bulletin C-36.1 of March 1964 as a "Type DC6R-add-Subtract Electromagnetic Counter." The said counter is essentially a dual input device and, as utilized in the system of this invention, functions to add pulses fed thereto through one of the said inputs and provide visible indicia thereof in digital form through the medium of a plurality of numbered indicating dials 66, and to subtract from this total the number of pulses supplied thereto through the other of said inputs with attendant reduction in the said total as displayed by the said indicating dials. Manually operable reset means 68 are provided on the counter 64 to enable the resetting of the numbered indicating dials 66 to zero.

A switch panel is indicated at 70 and includes each of an on-off selector switch 72, an up count start switch button 74, an up count stop switch button 76, a down count start switch button 78, and a reset switch button 80 positioned thereon. A detector switch is indicated at 82 and is disposed as shown adjacent the upper portion of the tripper means 32. A switch actuator member 84 extends as shown from the said detector switch toward the upper or terminal portion of the said tripper means, whereby the presence of materials on the said tripper means terminal portion may be readily detected by the said detector switch as should be obvious.

A relay mounting panel is indicated at 86 and includes a plurality of relays of nature and function as described in detail hereinbelow, mounted therewithin. Each of control means 40, add-subtract counter 64, control means 52, detector switch 82, switch panel 70, and control means 44 are connected to the said relay mounting panel as generally indicated by the lines 88, 90, 92, 94, 96 and 98, respectively, extending therebetween, and are inter-connected in the manner described in detail hereinbelow with reference to FIG. 2.

Referring now to FIG. 2, the control circuit of the conveyor system of the invention is generally indicated at 100, and comprises lines 102 and 104 across which a control voltage may be impressed from any convenient source thereof. The selector switch 72 is disposed as shown in line 102, whereby is believed made readily apparent that opening of the said switch will function to de-energize the entire control circuit 100 through the opening of switch contact member 73.

The gearing and pulsing device 58 includes a contact member 104 which is operated thereby and disposed as shown in line 106. The contact member 104 is closed and reopened for every complete revolution of the dock belt contact wheel 56, whereby one electrical pulse will be provided on line 106—assuming a circuit to be completed therethrough—for every revolution of the said contact wheel. A parallel network consisting of lines 108 and 110 is connected as shown across lines 104 and 106, and includes the add input coil 112 of add-subtract counter 64, connected in line 108, and the subtract input coil 114 of the said counter connected in line 110.

A zero count relay 116 is connected across line sources 102 and 104 by line 118, and a switch contact member 117 is mechanically connected, as indicated by the dashed line 120, to the add-subtract counter 64. The nature of the mechanical connection between the said switch contact member and add-subtract counter is such that the former is closed, and the zero count relay 116 energized accordingly through line 118, only when a zero count is indicated on the add-subtract counter 64.

An up count stop switch contact member 122, an up count start switch contact member 124, and an up count start relay 126, are connected in series across the said line sources by line 128. Normally open contacts 130 of the said up count start relay are connected as shown in parallel with the said up count start switch contact member by line 132 to establish a holding circuit for the said relay as should be obvious. The up count stop switch includes a second contact member 134, and the up count start switch includes a second contact member 136, with each of the said second contact members being connected acdoss the line soures 102 and 104 in a manner described in detail hereinbelow.

A holding relay 138 is connected across line sources 102 and 104 by line 140, and the up count start switch includes a third set of contacts 142, as indicated by the dashed line 144 extending therebetween, which contacts are connected as shown in line 140. The holding relay 138 includes a set of normally open contacts 146 which are connected in parallel with switch contact member 142 by line 150.

The contact member 152 of the reset switch, normally closed contacts 154 of zero count relay 116, down count start switch contact member 156, and down count relay 158 are connected as shown in series across the line sources 102 and 104 by line 160. Normally open contacts 162 of the down count relay 158 are connected in parallel with the down count start switch contact member 156 by line 164 to establish a holding circuit for the said relay.

The zero speed switch 48, and a zero speed switch relay 166 are connected in series across the line sources 102 and 104 by line 168, it being noted here that the said zero speed switch is arranged to operate so that the contact member 170 thereof is closed only when the dock conveyor 12 is motionless, or has gone from the motionless state to moving in the reverse direction, that is toward feed conveyor 16.

The contact member 134 of the up count stop switch and the control segment of the dock conveyor drive control means 44 which control the drive of the said dock conveyor in the forward direction are connected in series across the line sources by line 172.

Normally open contacts 174 of the down count relay 158, normally open contacts 176 of the zero speed switch relay 166, and the control segment 44R of the dock conveyor drive control means 44 which control the operation of the said dock conveyor in the reverse direction, are connected in series as shown across the line sources by line 178.

The second contact member 136 of the up count start switch 124, and a feeder conveyor drive control relay 180 are connected in series across the line sources by line 182, and normally open, feeder conveyor drive control relay contacts 184 are connected in parallel with the up count start switch contact member 136, by line 186, to provide a holding circuit for the said relay.

Normally closed contacts 188 of the feeder conveyor drive control relay 180, and the feeder conveyor drive control means 40 are connected in series across the line sources by line 190.

The contact member 192 of the detector switch 82, and the drive control means 52 of the shiploader support frame 34 are connected in series across the line sources by line 194.

Referring again to line 110, normally open contacts 196 of down count relay 158, up count interlock contacts 198 and normally open contacts 200 of the zero speed switch relay 166 are connected therein in series with the down count input coil 144 of the add-subtract counter 64. In line 108, normally open contacts 202 of up count relay 126, and normally closed down count interlock contacts 204 are connected in series with the up count input coil 112 of the said add-subtract counter; while normally closed contact 206 of the zero speed relay 166, and normally open contacts 208 of the holding relay 138, are connected in parallel with normally open contacts 202 by line 210.

Referring now to FIGS. 3A, 3B, 3C and 3D, respectively, the same may be noted to depict the conveyor system 10 of the invention disposed in operative relationship to a ship 30 for the transfer of materials, as indicated at 13, from the feeder conveyor 16 to the cargo hold opening 22, 24, 26, and 28, respectively, of the said ship. With regard to materials 13, the same may comprise, for example, unpackaged materials in the nature of wheat, coal or iron ore or, alternatively, crated articles of manufacture.

Each of FIGS. 3A, 3B, 3C and 3D depicts the conveyor system 10 at a different stage during the ship loading operation thereof, and will accordingly be made reference to in detail as a part of the hereinbelow-set-forth detailed description of the method of operation of this invention. In such operation, for example, in the loading of materials 13 through the cargo hold opening 28 of ship 30, the conveyor system 10 would be disposed relative to the said ship in the manner indicated in FIGS. 1 and 3A.

At this stage of the ship loading, utilization of the control circuit 100 would not be necessary whereby the same would be de-energized through the positioning of the selector switch 72 in the "off" position thereof, and the control of the feeder conveyor drive control means 40 and dock conveyor drive control means 44 accomplished in conventional manner. Thus, as indicated in FIG. 3A, the materials 13 would be fed from the feeder conveyor 16 to the dock conveyor 12, conveyed by the latter, in the direction indicated by arrow 219, onto the conventional tripper means 32, fall therefrom onto the shiploader 20 and be fed by the latter to the cargo hold opening 28 for loading in the ship cargo hold disposed therebelow.

Ultimately, a point may be reached whereby it will become necessary, in order to maintain proper trim of the ship 30 as discussed hereinabove, to discontinue the loading of materials through cargo hold opening 28 and commence the loading of the said materials through a cargo hold opening disposed relative to hold 28 in a direction opposite to arrow 219 such as, for example, opening 22. This will require energization of the control circuit 100, whereby the same is readily effected by the conveyor system operator through the movement of selector switch 72 from the "off" to the "on" position thereof to close the switch contact member 73 and apply the control voltage across the line sources 102 and 104.

Once the said control circuit has been energized, utilization thereof may be commenced through the depression of up count start button 76 by the conveyor system operator to move contact members 124, 136 and 142 of the up count start switch to the respective closed positions thereof.

The closing of contact member 124 will result in energization of upcount relay 126, through the closed contact member 122 of down count start switch 78 and line 128. The energization of up count relay 126 will result in the closure of normally open contacts 130 thereof to maintain a relay energization holding circuit therefor through the said contacts and line 132. The closure of switch contact member 136 will result in energization of the feeder conveyor drive control relay 180, through line 182, with attendant closure of normally open relay contacts 184 to establish a relay energization holding circuit therefor through line 186, and opening of normally closed relay contacts 188 with attendant de-energization of the feeder conveyor drive control means 40 to discontinue operation of the feeder conveyor drive motor 18.

The closure of switch contact member 142 will result in energization of holding relay 138, through line 140, with attendant closing of normally open relay contacts 146 to establish a relay energization holding circuit through line 150, and closing of normally open relay contacts 208, in line 210 for purposes described in detail hereinbelow.

The above-described energization of up count start relay 126 will also result in the closing of normally open relay contacts 202 in line 108, whereby intermittent pulses indicative of the number of feet which the upper reach of the dock conveyor 12 travels in the forward direction after the inactivation of feeder conveyor 16, will be provided to the input coil 112 of add-subtract counter 64 through the operation of gearing impulse and device 58 and the attendant opening and closing of contact member 104 in line 106. This is believed made clear whereby the up count start switch 76 need only be momentarily depressed by the conveyor system operator and then released, with the release thereof having no effect on the now energized relays 126, 138 and 180 because of the holding circuits established by the closing of relay contacts 130, 146 and 184, respectively.

Figure 3B:
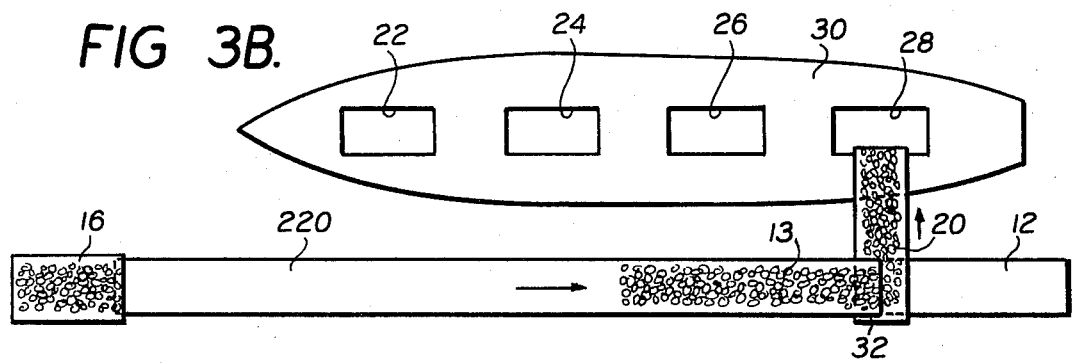

At this juncture, operation of the conveyor system 10 continues in the manner indicated by FIG. 3B with the materials 13 remaining on the dock conveyor 12 prior to the depression of the up count start switch 74 being fed to the cargo hold opening 28 in the manner described hereinabove, and an empty space as indicated at 220 being created on the upper reach of the said dock conveyor, through the discontinuance of the feed of materials 13 thereto by the now inactive feeder conveyor 16. In addition, the indicator dials 66 of the add-subtract counter 64 will function to continuously provide accurate, visual indication of the length of such empty space in feet.

Operation of the conveyor system 10 continues in this manner until the conveyor system operator, through the use of his experienced judgment, or visual observation of the total footage indicated by the indicator dials 66 of add-subtract counter 64, or both, concludes that the empty space 220 is of sufficient length to enable the movement of the shiploader support frame 34, and of course the tripper means 32 and shiploader 20, from alignment with cargo hold opening 28 to alignment with cargo hold opening 22 without requiring the removal of any of the materials 13 remaining on the conveyor 12, or the spillage of any of the said materials therefrom. When this point is reached, the conveyor system operator depresses and holds down the up count stop switch button 76 whereby switch contact member 122 is moved to the open position thereof to deenergize up count relay 126, and switch contact member 134 is moved to the open position thereof to de-energize control segment 44F of the dock conveyor drive control means 44 to, in turn, de-energize dock conveyor drive motor 14 and commence the discontinuance of forward movement of the dock conveyor 12.

Immediate stopping of the forward movement of the said dock conveyor is, of course, impossible, there being in most instances many tons of the materials 13 still disposed thereon at this point. Thus, the upcount is continued, as the dock conveyor coasts to a halt, through the normally closed contacts 206 of the still de-energized zero count relay 116, the now closed, normally open contact 208 of the now energized holding relay 138 and line 210, despite the opening of normally open contacts 202 attendant the de-energization of up count relay 126.

Once the dock conveyor 12 reaches a complete halt, to thus leave the empty space 220 (FIG. 3B) thereon, the contact member 170 of the zero speed switch 48 will close and will remain closed until forward movement of the said dock conveyor is re-commenced because the said switch is completely unaffected by dock conveyor movement in the reverse direction. Closing of zero speed switch contact member 170 results in energization of the zero speed relay 66, through line 168, with attendant opening of normally closed relay contacts 206 and attendant closing of normally open relay contacts 176 and 200. The opening of relay contacts 206 will discontinue the up count through the discontinuance of the intermittent transmission of pulses to the up count input 112 of the add-subtract counter 64.

As the conveyor system operator observes that the dock conveyor 12 has come to a complete halt, he depresses the down count switch button 78 while at the same time retaining the up count stop switch button 76 in the depressed position thereof to prevent re-energization of control segment 44F and the resumption of forward movement of the said conveyor through switch contact member 134 in line 172. Depression of down count switch button 78 functions to move switch contact member 156 to the closed position thereof whereby down count relay 158 is energized, through line 160, and a holding circuit for the energization thereof completed through the closing of normally open relay contact 162, and line 164. In addition, the conveyor system operator would, at this point, deactivate the non-illustrated drive motor means which drive the traveling shiploader conveyor 20 to leave the materials then disposed thereon, remaining thereon, as indicated in FIG. 3 of the drawings.

Energization of the down count relay 158 also closes the normally open contacts 196 thereof to thus complete a circiut for the intermittent transmission of pulses to the down count input coil 114 upon the commencement of reverse movement of the dock conveyor 12. This circuit is completed through line 106, the contact member 104 of gearing and pulsing device 58, line 110, the now closed down count relay contacts 196, up count interlock contacts 198, and the now closed contacts 200 of the zero speed switch relay.

Figure 3C:
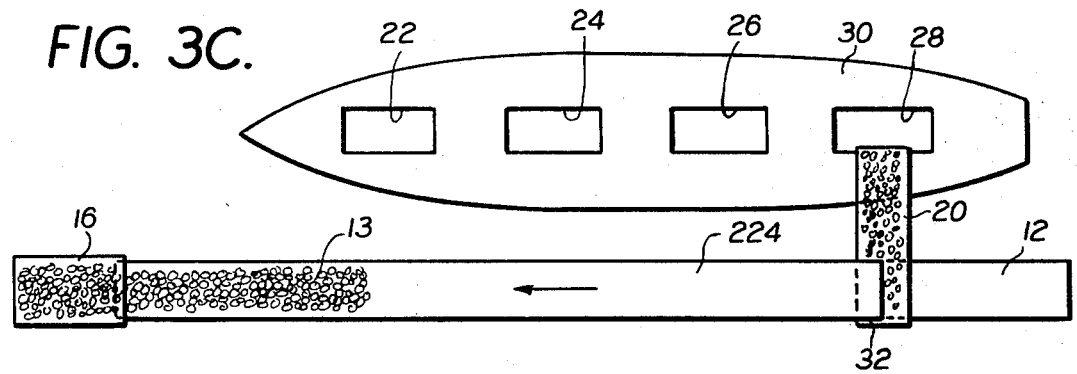

In addition, the energization of down count relay 158 closes normally open relay contacts 174 to result in energization of the control segment 44R of the dock conveyor drive control means, through the said contacts, the now closed contacts 176 of zero speed switch relay 166, and line 178, whereby movement of the dock conveyor 12 in the reverse direction, as indicated by the arrow 222 in FIG. 3C, will be commenced. Concurrently therewith, pulses indicative of the number of feet which the said conveyor is moving in the reverse direction will be intermittently transmitted to the down count input coil 114 of the add-subtract counter 64 through the hereinabove described, now completed down count pulse transmission circuit, and will result in the automatic subtraction of this number from the total up count in feet as previously displayed by the indicator dials 66. Thus is believed made clear whereby the said indicator dials will function to provide, at any given point in the operation of the conveyor system 10, indication in feet of the difference between the up count and the down count. Once movement of the dock conveyor 12 in the reverse direction has been commenced, the conveyor system operator may release both up count stop button 76 and down count start button 78 without further effect on the operation of the conveyor system 10. This is made possible because dock conveyor drive control means 40 are designed so that re-energization of control segment 44F, as will occur when the up count stop button 76 is released and contact member 134 recloses, will have no effect on the said drive control means at this time because the control segment 44R thereof is already energized. Too, the release of down count start button 78 and attendant re-opening of contact member 156 will not de-energize down count relay 158 because of the holding circuit provided therefor by relay contacts 162.

Operation of the dock conveyor 12 in the reverse direction continues in this manner to in essence move the materials 13 remaining thereon through the empty space 220 and accordingly create another empty space, as indicated by 224 in FIG. 3C, between the said materials and the tripper means 32 of length generally equivalent to, or somewhat greater than, the distance between cargo hold openings 28 and 22, respectively.

Once this has been accomplished, and a zero count reading is displayed by the indicator dials 66 of add-subtract counter 64, zero count relay 116 will be energized, through the closure of switch contact member 117 in line 118, by virtue of the mechanical connection 120 between the said switch contact member and add-subtract counter 64. This will result in the opening of normally closed contacts 154 of the said relay and attendant de-energization of down count relay 158 which in turn results in the re-opening of normally open contacts 196 and 174, respectively of the said down count relay. The re-opening of contacts 196 discontinues the transmission of pulses to input coil 114 to thus discontinue the down count, while the re-opening of contacts 174 discontinues the energization of control segment 44R of the dock conveyor drive control means 44 to result in the discontinuance of the drive of the dock conveyor 12 in the reverse direction by the conveyor drive motor 14. In this regard it is to be understood that since the dock conveyor 12 is driven at a much slower rate in the reverse direction than it is in the forward direction, the distance through which it coasts in the reverse direction will be too small to present any difficulty to this portion of the conveyor system operation. Thus, the dock conveyor 12 will have traveled substantially the same distance in the reverse direction as it did in the forward direction after the depression of the up count start button 76 by the conveyor system operator.

At this juncture in the conveyor system operation, the same will assume the appearance indicated by FIG. 3C wherein may be seen that the materials 13 remaining on the dock conveyor 12 after the discontinuance of the up count will have been moved in the reverse direction, as indicated by the arrow 221, a sufficient extent to leave the empty space 224 between the forwardmost of the said materials and the tripper means 32, it being again noted that extent of the said empty space corresponds generally to the distance between cargo hold openings 28 and 22, respectively.

Figure 3D:
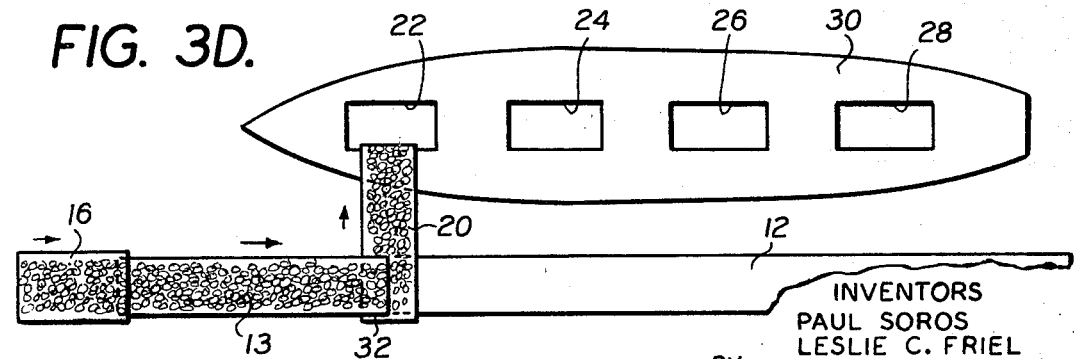

Next, the conveyor system operator actuates the ship loader support frame drive motor 38 through conventional, non-illustrated means to commence movement or "upstream traverse" as it is termed, of the said support platform, and the tripper means 32 and shiploader 20 which are supported thereby, in the direction of cargo hold opening 22, it being noted that this movement may now be effected with absolute convenience, and without requiring removal or spillage of materials and subsequent replacement thereof on the conveyor system, because of the provision of the empty space 224 therefor. This movement continues until the actuator member 84 of the normally closed detector switch 82 abuts the forward-most of the materials 13 remaining on the dock conveyor 12, whereupon the contact member 192 of the said detector switch is moved to the open position thereof to deenergize support frame drive control means 52 and discontinue the drive of the said support frame by the drive motor 38. Thus, the conveyor system 10 will have assumed the position thereof relative to ship 30 as indicated in FIG. 3D wherein the ship loader conveyor 20 may be seen to be properly positioned for loading the materials 13 from dock conveyor 12 through the cargo hold opening 22 of the said ship. Accordingly, the control circuit 100 may be de-energized by movement of selector switch 72 to the off position thereof, and the ship loading operation continued in normal manner through the reactivation of feeder conveyor 16 and dock conveyor 12 in the forward direction, and the reactivation of the traveling shiploader conveyor 20.

With regard to subsequent utilizations of the control circuit 100 to enable reverse movement of the tripper means 32 and shiploader 34, as for example from cargo hold opening 26 to cargo hold opening 24, it may be noted that the normally open contacts 208 of holding relay 138 will prevent the immediate commencement of an up count, through lines 210 and 108, until such time as the up count start button 76 is depressed by the conveyor system operator. Thus, immediate reutilization of the control circuit 100 need not be made upon the closing of selector switch 72.

The significance of the savings in time, and thus money, provided through the use of the method and system of this invention are believed made readily apparent by the fact that the said method and system make possible the reverse movement or "upstream traverse" of the tripper means 32 and shiploader 20 in less than 5% of the time required therefor by the methods and systems of the prior art.

While we have herein shown and described the preferred form of the present invention and have suggested various modifications therein, other changes and modifications may be made therein within the scope of the appended claims without departing from the spirit and scope of this invention.

What is claimed is:

1. In a method of moving materials through the use of materials feeding means, conveyor means cooperatively associated therewith for receiving materials therefrom, and materials loading means and materials transfer means cooperatively associated with said conveyor means for receiving materials therefrom and being spaced along said conveyor means from said materials feeding means whereby materials may be fed from said materials feeding means to said conveyor means, conveyed by the latter to said materials transfer means and transferred thereby to said materials loading means for the loading of said materials, the steps of, discontinuing operation of said materials feeding means while leaving materials remaining on said conveyor means, operating said conveyor means in the direction toward said materials transfer means to create an empty space between the materials remaining on said conveyor means and said materials feeding means, discontinuing operation of said conveyor means before all of the materials remaining thereon have been transferred to said materials loading means to thus leave an empty space on said conveyor means between said materials feeding means and said remaining materials, operating said conveyor means in the direction toward said materials feeding means to move said remaining materials through at least part of said empty space and create another empty space between said materials transfer means and said remaining materials, again discontinuing operation of said conveyor means to thus leave said another empty space thereon between said remaining materials and said materials transfer means, moving said materials transfer means and said materials loading means relative to said conveyor means toward said materials feeding means through at least part of said another empty space, and restarting operation of said materials feeding means and operation of said conveyor means in the direction toward said materials transfer and loading means.

2. A method as in claim 1 further comprising the steps of, measuring the distance moved by said conveyor means toward said materials loading means after the discontinuance of operation of said materials feeding means, and measuring the distance subsequently moved by said conveyor means towards said materials feeding means.

3. A method as in claim 2 further comprising the steps of, providing indicia of the first-mentioned distance during the first-mentioned movement of said conveyor means, and providing indicia of the difference between the first-mentioned distance and the second-mentioned distance during the second mentioned conveyor means movement.

4. A method as in claim 3 wherein, add-subtract counter means which comprise add input and subtract input means, respectively, are utilized to measure said distances and provide said indicia, and said measuring and indicia provision steps further comprise, the steps of, providing signals indicative of the first-mentioned distance to said add input means during the first-mentioned movement of said conveyor means, and providing signals indicative of the second-mentioned distance to said subtract input means during the second-mentioned movement of said conveyor means.

5. In a method of loading materials into different ones of spaced cargo hold openings of a ship through the use of feeder conveyor means, dock conveyor means which are cooperatively associated therewith for receiving materials therefrom and comprise tripper means which are movable relative to said dock conveyor means, and shiploader means which are cooperatively associated with said tripper means and are movable with said tripper means, relative to said dock conveyor means and to said spaced cargo hold openings into operative loading relationship with different ones of the latter, whereby materials may be conveyed from said feed conveyor means to said dock conveyor means, conveyed by the latter to said tripper means, transferred by said tripper means to said shiploader means, and moved by said shiploader means to the one of said spaced cargo hold openings with which said shiploader means is, at that time, in operative loading relationship, the steps of, discontinuing operation of said feed conveyor while leaving materials remaining on said dock conveyor means, continuing operation of said dock conveyor means to move the materials remaining thereon toward said tripper means and create an empty space on said dock conveyor means between said remaining materials and said feed conveyor means, discontinuing operation of said dock conveyor means before all of the materials remaining thereon have been transferred to said materials loading means, to thus leave an empty space on said dock conveyor means between said remaining materials and said feed conveyor means, operating said dock conveyor means to move said remaining materials away from said tripper means and toward said feed conveyor means through at least part of said empty space to create another empty space on said dock conveyor means between said tripper means and said remaining materials, again discontinuing operation of said dock conveyor means, moving said tripper means and said shiploader means relative to said dock conveyor means toward said feed conveyor means through at least part of said another empty space to remove said shiploader means from operative loading relationship with the said one of said cargo hold openings and into operative loading relationship with another of said cargo hold openings, and restarting operation of said feed conveyor means and operation of said dock conveyor means to convey materials to said shiploader means for loading into said another of said cargo hold openings.

6. A method as in claim 5 further comprising, the steps of, measuring the distance moved by said dock conveyor means toward said tripper means after the discontinuance of operation of said feed conveyor means, and measuring the distance subsequently moved by said dock conveyor means toward said feed conveyor means.

7. A method as in claim 6 further comprising, the steps of, displaying indicia of the first-mentioned distance during the first-mentioned dock conveyor moving means step, and displaying indicia of the difference between this first-mentioned distance and the second-mentioned distance during the second-mentioned dock conveyor means moving step.

8. A method as in claim 7 wherein, add-subtract counter means which comprise add input and subtract input means, respectively, are utilized to measure said distances and display said indicia, and said measuring and display steps further comprise, the steps of, providing signals indicative of the first-mentioned distance to said add input means during said first-mentioned dock conveyor means movement, and providing signals indicative of said second-mentioned distance to said subtract input means during said second-mentioned dock conveyor means movement.

9. In a conveyor system for moving materials through the use of materials feeding means, conveyor means cooperatively associated therewith for receiving materials therefrom, and materials transfer means and materials loading means cooperatively associated with said conveyor means for receiving materials therefrom and being spaced along said conveyor means from said materials feeding means whereby materials may be fed from said materials feeding means to said conveyor means, conveyed by the latter to said materials transfer means and transferred thereby to said materials loading means for the loading of said materials, the improvements comprising, means for discontinuing operation of said materials feeding means while leaving materials remaining on said conveyor means, means for operating said conveyor means in the direction toward said materials transfer means to move said remaining materials toward the latter and create an empty space between said remaining materials on said conveyor means and said materials feeding means, means for discontinuing operation of said conveyor means before all of the materials remaining thereon have been transferred to said materials loading means to thus leave an empty space on said conveyor means between said materials feeding means and said remaining materials, means for operating said conveyor means in the direction toward said materials feeding means to move said remaining materials through at least part of said empty space and create another empty space between said materials transfer means and said remaining materials, automatically operable means for again discontinuing operation of said conveyor means after the latter have moved said remaining materials substantially the same distance toward said materials feeding means as said remaining materials had previously been moved by said conveyor means toward said materials transfer means to thus leave said another empty space on said conveyor means between said remaining materials and said materials transfer means, means for moving said materials transfer means, and said materials loading means relative to said conveyor means toward said materials feeding means through at least part of said another empty space, and means for restarting operation of said materials feeding means and operation of said conveyor means in the direction toward said materials transfer and loading means.

10. A conveyor system as in claim 9 further comprising, means for measuring the distance moved by said conveyor means toward said materials loading means after the discontinuance of operation of said materials feeding means, and means for measuring the distance subsequently moved by said conveyor means towards said materials feeding means.

11. A conveyor system as in claim 10, further comprising, means for providing indicia of the first-mentioned distance during the first-mentioned movement of said conveyor means, and means for providing indicia of the difference between the first-mentioned distance and the second-mentioned distance during the second-mentioned conveyor means movement.

12. A conveyor system as in claim 11 wherein, said means to measure said distances and provide said indicia comprise add-subtract counter means, which include add input means and subtract input means, respectively, and said conveyor system further comprises, means for providing signals indicative of the first-mentioned distance to said add input means during the first-mentioned movement of said conveyor means, and means for providing signals indicative of the second-mentioned distance to said subtract input means during the second-mentioned movement of said conveyor means.

13. A conveyor system as in claim 12 wherein, said automatically operable means for again discontinuing operation of said conveyor means comprise means cooperatively associated with said add-subtract counter means and operable in response to the provision by the latter of indicia of no difference between the first-mentioned distance and the second-mentioned distance, to again discontinue operation of said conveyor means.

14. A conveyor system as in claim 13 wherein, said means for operating said conveyor means in the direction toward said materials feeding means comprise zero speed switch means cooperatively associated with said conveyor means and operable in response to the discontinuance of operation of the latter toward said materials transfer means, to commence operation of said conveyor means in the direction toward said materials feeding means.

15. A conveyor system as in claim 9 further comprising, detecting means cooperatively associated with materials transfer means and operable to detect the presence of said remaining materials on the latter and discontinue said movement of said materials transfer means, upon such detection, and said materials loading means, relative to said materials feeding means.

References Cited
UNITED STATES PATENTS 1,313,375  8/1919  Frazier.
2,788,134  4/1957  Miller et al. _____ 198—110 X ROBERT G. SHERIDAN, *Primary Examiner.*

F. E. WERNER, *Assistant Examiner.*